(12) United States Patent
Lu

(10) Patent No.: US 12,475,976 B2
(45) Date of Patent: Nov. 18, 2025

(54) POPULATION PK/PD LINKING PARAMETER ANALYSIS USING DEEP LEARNING

(71) Applicant: Genentech, Inc., South San Francisco, CA (US)

(72) Inventor: James Lu, San Francisco, CA (US)

(73) Assignee: Genentech, Inc., South San Francisco, CA (US)

( * ) Notice: Subject to any disclaimer, the term of this patent is extended or adjusted under 35 U.S.C. 154(b) by 440 days.

(21) Appl. No.: 17/951,781

(22) Filed: Sep. 23, 2022

(65) Prior Publication Data

US 2023/0018216 A1  Jan. 19, 2023

Related U.S. Application Data

(63) Continuation of application No. PCT/US2021/024257, filed on Mar. 25, 2021.

(60) Provisional application No. 62/994,701, filed on Mar. 25, 2020.

(51) Int. Cl.
*G16C 20/70* (2019.01)
*G16C 20/50* (2019.01)

(52) U.S. Cl.
CPC ............. *G16C 20/70* (2019.02); *G16C 20/50* (2019.02)

(58) Field of Classification Search
CPC ........ G16C 20/70; G16C 20/50; G16C 20/30; G06N 3/045; G06N 3/08
See application file for complete search history.

(56) References Cited

U.S. PATENT DOCUMENTS

2019/0172584 A1* 6/2019 Athey .................... G16B 40/30
2019/0362856 A1* 11/2019 Jiang .............. C12Y 304/21022
2021/0090694 A1* 3/2021 Colley ................... G16B 30/00

OTHER PUBLICATIONS

Liu et al., Narrowing the Gap Between In Vitro and In Vivo Genetic Profiles by Deconvoluting Toxicogenomic Data In Silico, Jan. 8, 2020, Frontiers in Pharmacology, vol. 10, article 1489, pp. 1-17, doi: 10.3389/fphar.2019.01489 (Year: 2020).*
Keutzner et al., "Pharmacokinetic Data: Differences, Similarities and Challenges Illustrated with Rifampicin", Jun. 3, 2022, Pharmaceutics, 14(8), 1530, pp. 1-29, https://doi.org/10.3390/pharmaceutics14081530 (Year: 2022).*
Wu et al., "Predicting pharmacodynamic effects through early drug discovery with artificial intelligence-physiologically based pharmacokinetic (AI-PBPK) modelling", Feb. 16, 2024, Frontiers in Pharmacology, vol. 15, pp. 1-13, https://doi.org/10.3389/fphar.2024.1330 (Year: 2024).*

(Continued)

*Primary Examiner* — Mi'Schita' Henson
(74) *Attorney, Agent, or Firm* — Baker Botts L.L.P.

(57) ABSTRACT

A method and system for predicting a set of linking parameters that relate pharmacokinetic and pharmacodynamic effects. One or more processors receive a population dataset that comprises a population pharmacokinetic (PK) dataset and a population pharmacodynamic (PD) dataset. The one or more processors transform the population dataset into a plurality of data density images that includes a PK data density image and a PD data density image. The one or more processors predict the set of linking parameters using the plurality of data density images.

18 Claims, 11 Drawing Sheets

(56) References Cited

OTHER PUBLICATIONS

Shigeo Yamamura, Artificial Neural Network Modeling to Predict Pharmacokinetic Parameters of Severely Burn Patients, Journal of Pharmaceutical Science and Technology, vol. 74, Issue 4, pp. 248-256, Released on J-STAGE Jan. 1, 2015, Jan. 1, 2015.

Sharma, et al., DeepInsight: A methodology to transform a non-Image data to an image for convolution neural network architecture. Sci Rep 9, 11399 (2019). https://doi.org/10.1038/s41598-019-47765-6, Aug. 6, 2019, pp. 1-7, Aug. 6, 2019.

Chien, et al., Pharmacokinetics/pharmacodynamics and the stages of drug development: Role of modeling and simulation. AAPS J 7, 55 (2005). https://doi.org/10.1208/aapsj070355, vol. Oct. 07, Jul. 2005, E544-E559, Oct. 7, 2005.

International search report and Written Opinion received for PCT Application No. PCT/US2021/024257, 10 pages, Jul. 9, 2021.

Lu James et al.: "Deep learning prediction of patient response time course from early data via neural-pharmacokinetic/pharmacodynamic modelling", Nature Machine Intelligence, Jun. 21, 2021 (Jun. 21, 2021), Nat Mach Intell., Author manuscript, available in PMC Apr. 23, 2025, DOI: 10.1038/s42256-021-00357-4, Retrieved from the Internet: URL:http://www.nature.com/articles/s42256-021-00357-4, Apr. 23, 2025.

\* cited by examiner

POPULATION PK/PD LINKING PARAMETER ANALYSIS USING DEEP LEARNING

FIELD

This description is generally directed towards systems and methods for estimating or predicting pharmacological properties of therapeutics. More specifically, machine learning-based systems and methods for accurately estimating or predicting population pharmacokinetic and pharmacodynamic properties of therapeutics, are disclosed herein.

BACKGROUND

The development of new drugs (e.g., therapeutics) is driven by progress in many disciplines. Such disciplines include drug discovery, biotechnology, and in vivo and in vitro pharmacological/toxicological characterization techniques. Before a new therapeutic can move from a molecule or protein in the laboratory to become a new product in the hospital/clinic or local pharmacy, various questions must be answered with respect to the efficacy, administration, safety, and side effects associated with the therapeutic. Answering these types of questions typically involves a series of clinical trials, which are carefully designed to study the various facets of a new drug candidate.

Pharmacokinetics (PK) and pharmacodynamics (PD) are scientific disciplines associated with therapeutic development that typically involve mathematical modeling. In popular terms, PK (or pK) is often described as "what the body does to the drug" and PD (or pD) as "what the drug does to the body." More specifically, PK may focus on modeling how the body acts on the drug once it is administered and is subjected to the four bodily processes of absorption, distribution, metabolism and elimination or excretion (ADME). This may be accomplished by modeling concentrations in the body generally or in various areas of the body as a function of time. PD aims at linking these modeled drug concentrations to certain drug effects through a PD-model specifically designed to evaluate those effects. PK/PD modeling may thus link systemic drug concentration kinetics to the resulting drug effects over time. Such modeling enables the description and prediction of the time course of various physiological effects (e.g., tumor cell count, platelet count, neutrophil count, etc.) in response to various dosage regimens.

Conventional mathematical modeling methodologies for PK/PD evaluation may require iterations of model evaluation and refinement, with human judgement involved in various steps within the loop. This can be time and labor intensive. Examples of such existing mathematical algorithms include expectation-maximization, genetic algorithms, and scatter search. These techniques may be optimization-based, which in practice may mean that the scientist creating the model performs many function and gradient evaluations involving significant trial-and-error. Accordingly, effectively using these existing mathematical techniques to model PK and PD involves a significant amount of know-how and computational time. The know-how prerequisite and computational resource requirement represent significant obstacles along the path towards the broad adoption of PK, PD, and PK/PD modeling for non-expert users.

SUMMARY

In one or more embodiments, a method is provided for predicting a set of linking parameters that relate pharmacokinetic and pharmacodynamic effects. One or more processors receive a population dataset that comprises a population pharmacokinetic (PK) dataset and a population pharmacodynamic (PD) dataset is received. The one or more processors transform the population dataset into a plurality of data density images that includes a PK data density image and a PD data density image. The one or more processors predict the set of linking parameters using the plurality of data density images.

In one or more embodiments, a system is provided for predicting a set of linking parameters that relate pharmacokinetic and pharmacodynamic effects. The system comprises a data storage, a computing device communicatively connected to the data storage, and a display system communicatively connected to the computing device. The data storage is configured for storing a population dataset that comprises a population pharmacokinetic (PK) dataset and a population pharmacodynamic (PD) dataset. The computing device comprises a data manager and a prediction system. The data manager is configured to receive the population dataset and to transform the population dataset into a plurality of data density images that includes a PK data density image and a PD data density image. The prediction system is configured to predict the set of linking parameters using the plurality of data density images. The display system is configured to display a report containing a predicted value for each linking parameter of the set of linking parameters.

In one or more embodiments, a method is provided for predicting a set of linking parameters that relate pharmacokinetic and pharmacodynamic effects. One or more processors receive a population dataset that comprises a population pharmacokinetic (PK) dataset and a population pharmacodynamic (PD) dataset. The one or more processors transform the population dataset into a plurality of binned intensity images that includes a PK binned intensity image and a PD binned intensity image. The one or more processors predict the set of linking parameters using the plurality of binned intensity images and a deep learning system that comprises at least one neural network.

BRIEF DESCRIPTION OF THE DRAWINGS

For a more complete understanding of the principles disclosed herein, and the advantages thereof, reference is now made to the following descriptions taken in conjunction with the accompanying drawings, in which.

Figure 1:
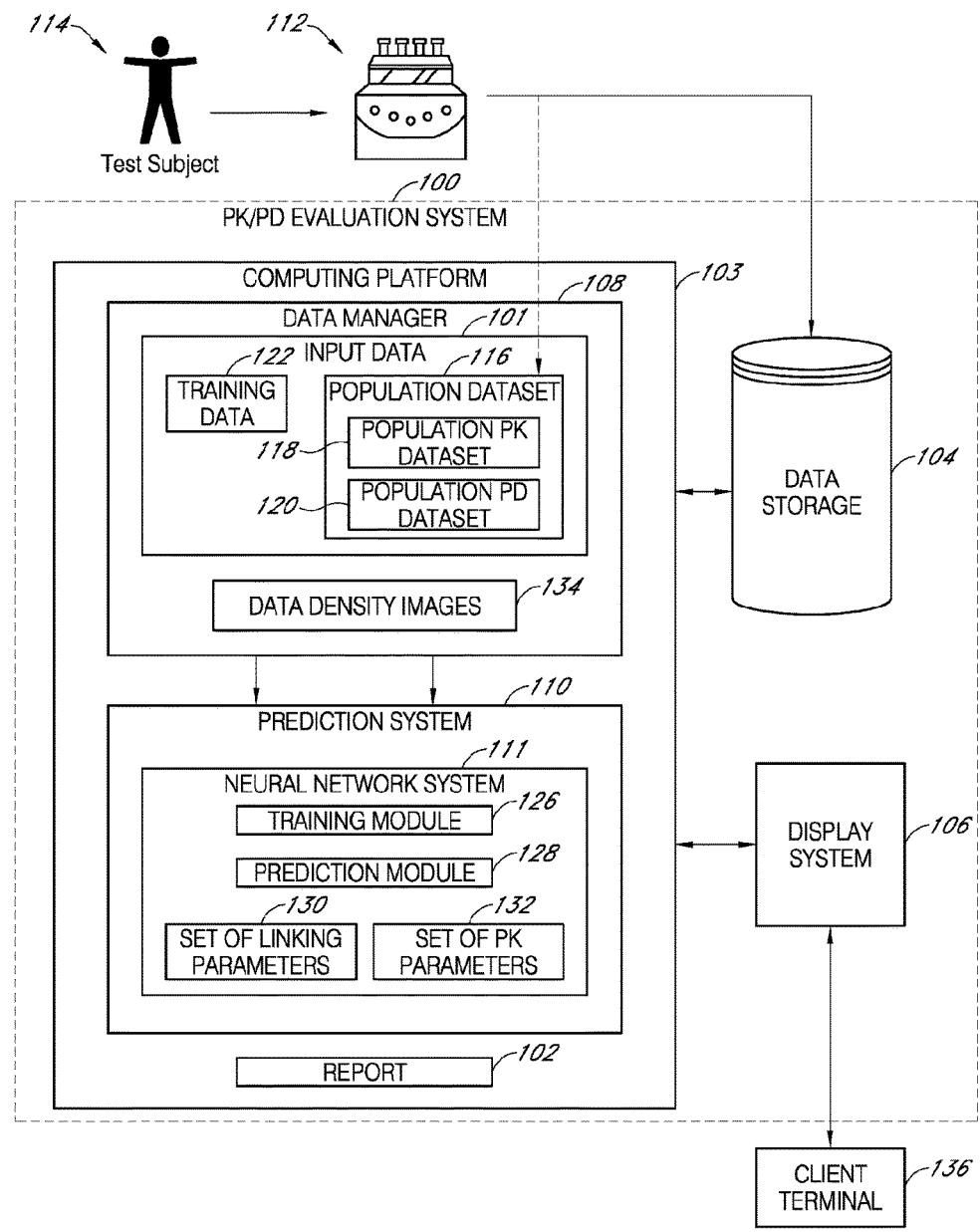
FIG. 1 is a block diagram of a pharmacokinetic (PK)/pharmacodynamic (PD) evaluation system in accordance with one or more example embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

I. Overview

The principles of pharmacokinetics/pharmacodynamics (PK/PD) have become a well-established quantitative framework for understanding the dose-concentration-effect relationships of various therapeutics (or drugs) and selecting the proper protocols (e.g., dosage, schedules, etc.) for such therapeutics. As used herein, PK/PD may refer to PK, PD, or both. Population PK/PD modeling refers to the study of pharmacokinetics, pharmacodynamics, or both with respect to a subject (or patient) population. Understanding population PK/PD may include understanding associations between subject (or patient) characteristics and differences in PK/PD that can then be used in therapeutic development. For example, population PK/PD can be used to customize pharmacotherapies. Because multiple samples from a same subject are not generally required when analyzing PK/PD for a population, such population-based analysis may be helpful in evaluating subject groups that tend to be more difficult to study such as, for example, but not limited to, subject groups comprising subjects who are widely geographically distributed.

Currently available methodologies for analyzing PK/PD and, in particular, population PK/PD, may be computationally-intensive, time-consuming, and/or require a certain level of knowledge and/or experience. For example, some currently available methodologies use modeling methodologies that may require multiple iterations of model evaluation and refinement, with human intervention being involved at various steps within the overall process. The time, computational power, and technical knowledge and/or expertise involved in such modeling methodologies may present obstacles to adopting these modeling methodologies for real-time applications, usage by non-technical users, or both.

Thus, this specification describes various exemplary embodiments of machine learning-based or deep-learning based systems and methods for quickly, efficiently, and accurately analyzing population PK/PD with reduced (or, in various cases, zero) human intervention. The embodiments described herein enable estimating or predicting population pharmacokinetic and/or properties of therapeutics. It should be appreciated, however, that although the systems and methods disclosed herein refer to their application in pharmacokinetics and pharmacodynamics specifically, they are equally applicable to other analogous fields such as toxicokinetics and toxicodynamics.

The embodiments described herein provide methods and systems for transforming a population dataset into data density images that can then be processed to predict one or more linking parameters that relate PK and PD effects. The population dataset may include, for example, at least one population PK dataset (e.g., a clinical population PK dataset) and at least one population PD dataset (e.g., a clinical population PD dataset). The population PK dataset provides data about PK effects observed in a population, while the population PD dataset provides data about PD effects observed in a population. As previously described, a PK effect may refer to a dose effect or an effect of the body on the drug in the body (e.g., drug concentration). A PD effect may refer to a drug effect (or effect of a drug on the body) and may be dependent on the dose effect.

The data density images may include, for example, without limitation, at least one PK data density image and at least one PD data density image. A data density image provides an indication of the number of times or instances (i.e., density) a particular data point (e.g., a PK value such as drug concentration or a PD value such as neutrophil count) occurs in the population dataset. The one or more PK data density images and the one or more PD data density images are used to predict one or more linking parameters. These one or more linking parameters describe the relationship between PK effect and PD effect. Examples of linking parameters include, but are not limited to, slope, maximal drug effect ($E_{max}$), and half maximal effective concentration ($EC_{50}$). The slope indicates drug effect with respect to dose effect (e.g., drug concentration). The maximal drug effect, $E_{max}$, is the maximum effect of a drug at high drug concentrations. The half maximal effective concentration, $EC_{50}$, is the drug concentration that provides 50% of the maximum effect, or the half-maximal effect of the drug. A linking parameter may also be referred to as a PD parameter.

In various embodiments, one or more methods and systems are provided for predicting one or more linking parameters. A population dataset that includes a population PK dataset and population PD dataset may be received. The population dataset may include data obtained for multiple subjects over different points of time and, in many cases, may be pooled from multiple studies or clinical trials. The population dataset may be transformed into a plurality of data density images. The data density images including, for example, a PK data density image and a PD data density image. The data density images are processed to predict a value for at least one linking parameter. In some embodiments, this prediction is made via a deep learning system. The deep learning system may include, for example, or more neural network models that are used to predict one or more linking parameters. A linking parameter is a parameter that links or otherwise associates the data from both the population PK dataset and the population PD dataset. In one or more embodiments, the data density images are used to determine a slope that defines the PD effect with respect to PK effect (e.g., drug concentration). In other embodiments, one or more other types of linking parameters may be instead or additionally predicted.

Understanding the relationship between PD and PK effects in a population may be invaluable to the development of a therapeutic, the customizing of that therapeutic to a particular individual, the development of a clinical trial for the therapeutic, the development of a modification to or newer version of the therapeutic, some other type of therapeutic-based developmental work, or a combination thereof.

II. Prediction of Linking Parameters Using Deep Learning

FIG. 1 is a block diagram of a pharmacokinetic (PK)/pharmacodynamic (PD) evaluation system 100 in accordance with one or more example embodiments. PK/PD evaluation system 100 may be used to evaluate PK effects and PD effects resulting from the administration of a drug (e.g., therapeutic) in a population. In various embodiments, PK/PD evaluation system 100 is trained based on observed data and then used to predict one or more PK parameters, one or more linking parameters, or a combination thereof.

PK/PD evaluation system 100 may be used in various settings including, but not limited to, a research setting, a clinical trial setting, a drug development setting, a hospital setting, or in some other type of setting. PK/PD evaluation system 100 may receive and process input data 101 to generate a report 102 that describes and/or contains information based on input data 101.

PK/PD evaluation system 100 includes computing platform 103, data storage 104, and display system 106. Computing platform 103 may take various forms. In one or more embodiments, computing platform 103 includes a single computer (or computer system) or multiple computers in communication with each other. In other examples, computing platform 103 takes the form of a cloud computing platform. In some embodiments, computing platform 103 is referred to as a computing device/analytics server. In some embodiments, computing platform 103 can be a workstation, mainframe computer, distributed computing node (part of a "cloud computing" or distributed networking system), personal computer, mobile device, etc.

Data storage 104 and display system 106 are each in communication with computing platform 103. Data storage 104 may communicatively connected to computing platform 103 in various ways such as, but not limited to, a network connection that can be either a "hardwired" physical network connection (e.g., Internet, LAN, WAN, VPN, etc.) or a wireless network connection (e.g., Wi-Fi, WLAN, etc.).

In some examples, data storage 104, display system 106, or both may be considered part of or otherwise integrated with computing platform 103. Thus, in some examples, computing platform 103, data storage 104, and display system 106 may be separate components in communication with each other, but in other examples, some combination of these components may be integrated together.

PK/PD evaluation system 100 includes data manager 108 and prediction system 110 implemented in the computing platform 103. Each of the data manager 108 and the prediction system 110 is implemented using hardware, software, firmware, or a combination thereof. Data manager 108 may include, for example, a training data simulation engine, an image rendering engine, or both. Prediction system 110 may also be referred to as a linking parameter prediction engine (or population linking parameter prediction engine or PK/PD linking parameter prediction engine).

It should be appreciated that the various components or engines of PK/PD evaluation system 100 can be combined or collapsed into a single engine, component, or module, depending on the requirements of the particular application or system architecture. Moreover, in various embodiments, data storage 104, data manager 108, prediction system 110 or a combination thereof may comprise additional engines or components as needed by the particular application or system architecture.

In various embodiments, data manager 108 receives or retrieves input data 101. Input data 101 may be retrieved from the data storage 104, received from some other source, or a combination thereof. Input data 101 may have been generated via one or more samples from one or more subjects. For example, a sample analyzer 112 can be communicatively connected to data storage 104 via one or more communications links (e.g., via a serial bus, a wireless network connection, etc.). Sample analyzer 112 can be configured to analyze blood samples from a population 114, which may also be referred to as a test population, that includes multiple subjects. Various time series datasets can be generated from these samples and stored in data storage 104 for subsequent processing. For example, sample analyzer 112 may generate population dataset 116 for population 114 that is stored in data storage 104 for processing. Population dataset 116 may include, for example, without limitation, population PK dataset 118 and population PD dataset 120. Population PK dataset 118 may include, for example, data points in which each data point identifies a dose effect (e.g., drug concentration) in a subject at a point in time (e.g., a particular day, hour, or other unit of time after administration of the drug) for the various subjects of population 114. Population PD dataset 120 may include, for example, data points in which each data point identifies a drug effect (e.g., neutrophil count, etc.) in a subject at a point in time (e.g., a particular day, hour, or other unit of time after administration of the drug) for the various subjects of population 114.

Data manager 108 transforms input data 101 into data density images 134. Data density images 134 include at least one PK data density image and at least one PD data density image. When data density images 134 are generated for training data 122, they may be referred to as simulated data density images. A data density image is an image or representation that provides information about the density of data points in input data 101 corresponding to selected dose effects and selected point in times.

For example, a data intensity image may take the form of a binned intensity image in which each pixel value in at least a portion of the binned intensity image indicates a density of data points corresponding to a selected effect (e.g., for PK—dose effect, for PD—drug effect) and a selected point in time. In some embodiments, with a binned intensity image, data values may be placed into "bins" with respect to effect (e.g., for PK—dose effect, for PD—drug effect), points in time, or both. For example, points in time that have a value with a selected interval may be replaced by a value representative of that interval (e.g., the central value). This may be repeated for multiple intervals over a range to form a series of bins. Effect values (e.g., drug concentration values, neutrophil count values, etc.) that have a value with a selected interval may be replaced by a value representative of that interval (e.g., the central value). This may be repeated for multiple intervals over a range to form a series of bins. In other embodiments, data density images 134 may take the form of some other type of quantization representation of input data 101.

Data manager 108 sends data density images 134 into prediction system 110 for processing. Prediction system 110 is a machine learning or deep learning system. In one or more embodiments, prediction system 110 includes a neural network system 111. The neural network system 111 includes one or more neural network models. For example, the neural network system 111 may include a training module 126 and a prediction module 128. When the neural network system 111 is being trained, training module 126 may process data density images 134 generated based on training data 122. Once trained, the neural network system 111 may be used in practice to predict a set of linking parameters 130, set of PK parameters 132, or both based on data density images 134 generated based on population dataset 116. Thus, the type of data density images 134 provided to the neural network system 111 may take different forms depending on whether the neural network system 111 is in a training mode or in a prediction mode.

Set of linking parameters 130 may include, for example, at least one of a slope, a half-maximal effective concentration ($EC_{50}$), or a maximum effect ($E_{max}$). The slope indicates drug effect with respect to dose effect (e.g., drug concentration). As one example, the slope associated with the drug effect of proliferating progenitor cells may describe how much an increase in drug concentration inhibits the synthesis of proliferating progenitor cells. The maximal drug effect, $E_{max}$, is the maximum effect of a drug at high drug concentrations. The half maximal effective concentration, $EC_{50}$, is the drug concentration that provides 50% of the maximum effect, or the half-maximal effect of the drug. With respect to population 114, a linking parameter of set of linking parameters 130 may be an average (or mean), a median, a standard deviation, or other population-based descriptive statistical metric of the parameter. For example, the slope may be an average slope, a median slope, or some other slope value representative of the slope values associated with population 114. In some embodiments, set of linking parameters 130 may also be referred to as a set of PD parameters.

Set of PK parameters 132 may include, for example, at least one of an area under the curve (AUC), a minimum concentration ($C_{min}$), a maximum concentration ($C_{max}$), a time to reach $C_{max}$ ($T_{max}$), an elimination half-life ($t_{1/2}$), a mean residence time (MRT), a last measurable concentration ($C_{Last}$) (e.g., before a next dose), a time to reach $C_{Last}$ ($T_{Last}$), or another PK parameter. With respect to population 114, a PK parameter of set of PK parameters 132 may be an average (or mean), median, a standard deviation, or another population-based descriptive statistical metric of the parameter. For example, the AUC may be a mean AUC, a median AUC, or some other AUC value representative of the AUCs corresponding to population PK dataset 118 for population 114. As another example, $C_{min}$ may be a mean $C_{min}$, a median $C_{min}$, or some other $C_{min}$ value representative of the $C_{min}$ values associated with population PK dataset 118.

After these one or more parameters have been predicted, prediction system 110 may generate report 102 which can be displayed on display system 106. Display system 106 in some embodiments may be implemented at a client terminal 136 that is communicatively connected to computing platform 103. In various embodiments, client terminal 136 can be a thin client computing device. In various embodiments, client terminal 136 can be a personal computing device having a web browser (e.g., INTERNET EXPLORER™, FIREFOX™, SAFARI™, etc.) that can be used to control the operation of data storage 104, data manager 108, prediction system 110, or a combination thereof.

Report 102 may include, for example, the values for set of linking parameters 130, set of PK parameters 132, or both. In one or more examples, report 102 may include one or more recommended actions based on a predicted PK time course.

Figure 2:
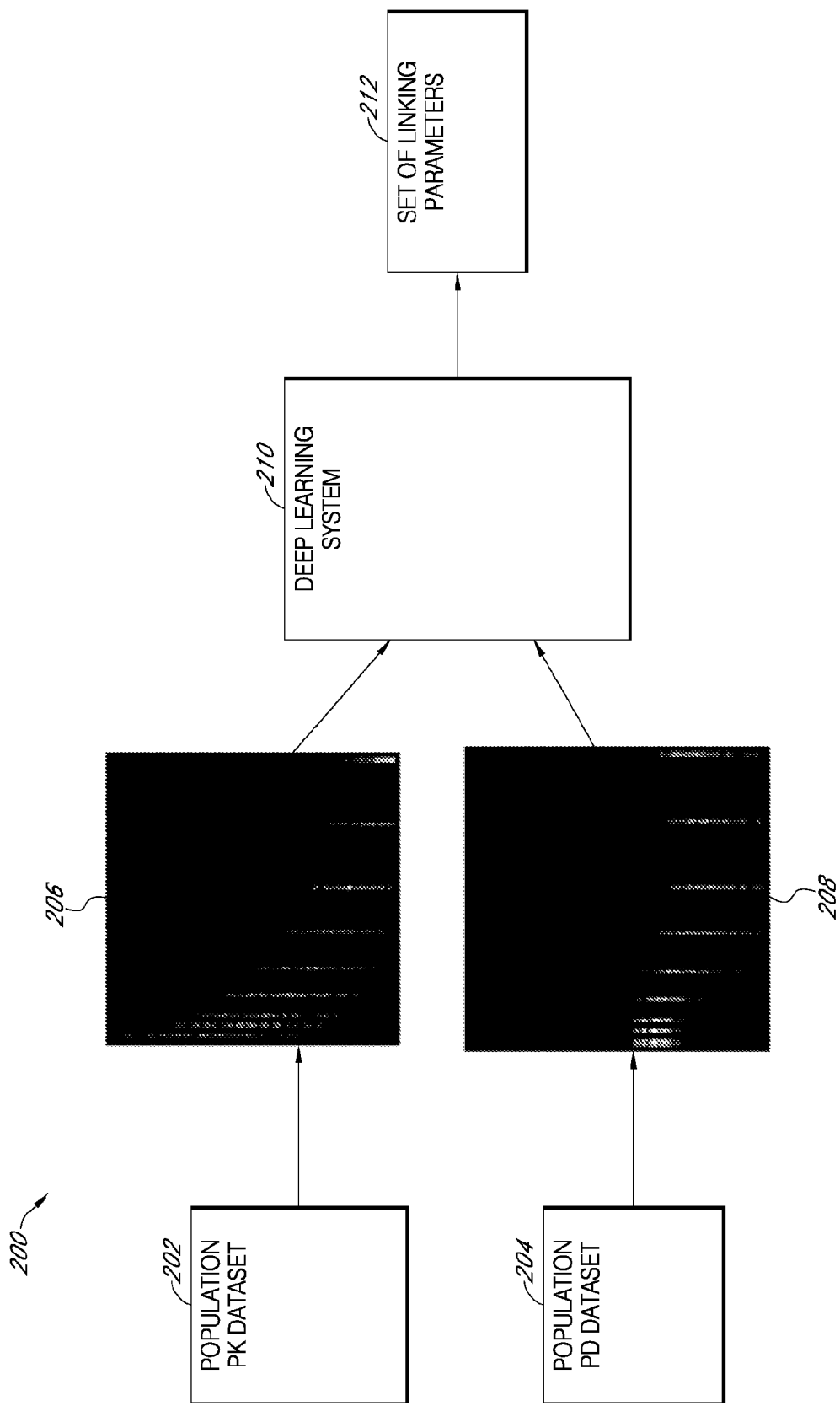
FIG. 2 is a schematic diagram of a prediction workflow in accordance with various embodiments.

FIG. 2 is a schematic diagram of a prediction workflow in accordance with various embodiments. Prediction workflow 200 one example of a manner in which the prediction of a set of linking parameters may be implemented using PK/PD evaluation system 100 in FIG. 1. Prediction workflow 200 includes transforming population PK dataset 202 and population PD dataset 204 into PK data density image 206 and PD data density image 208, respectively. Population PK dataset 202 and population PD dataset 204 are examples of implementations for population PK dataset 118 and population PD dataset 120 in FIG. 1. PK data density image 206 and PD data density image 208 are one example of an implementation for data density images 134 in FIG. 1.

PK data density image 206 and PD data density image 208 may be both input into deep learning system 210, which is one example of an implementation for prediction system 110 in FIG. 1. Deep learning system 210 processes PK data density image 206 and PD data density image 208 to predict set of linking parameters 212. Set of linking parameters 212 may include at least one of slope, maximal drug effect ($E_{max}$), half maximal effective concentration ($EC_{50}$), or another linking parameter that describes the relationship between population PK dataset 202 and population PD dataset 204.

Figure 3:
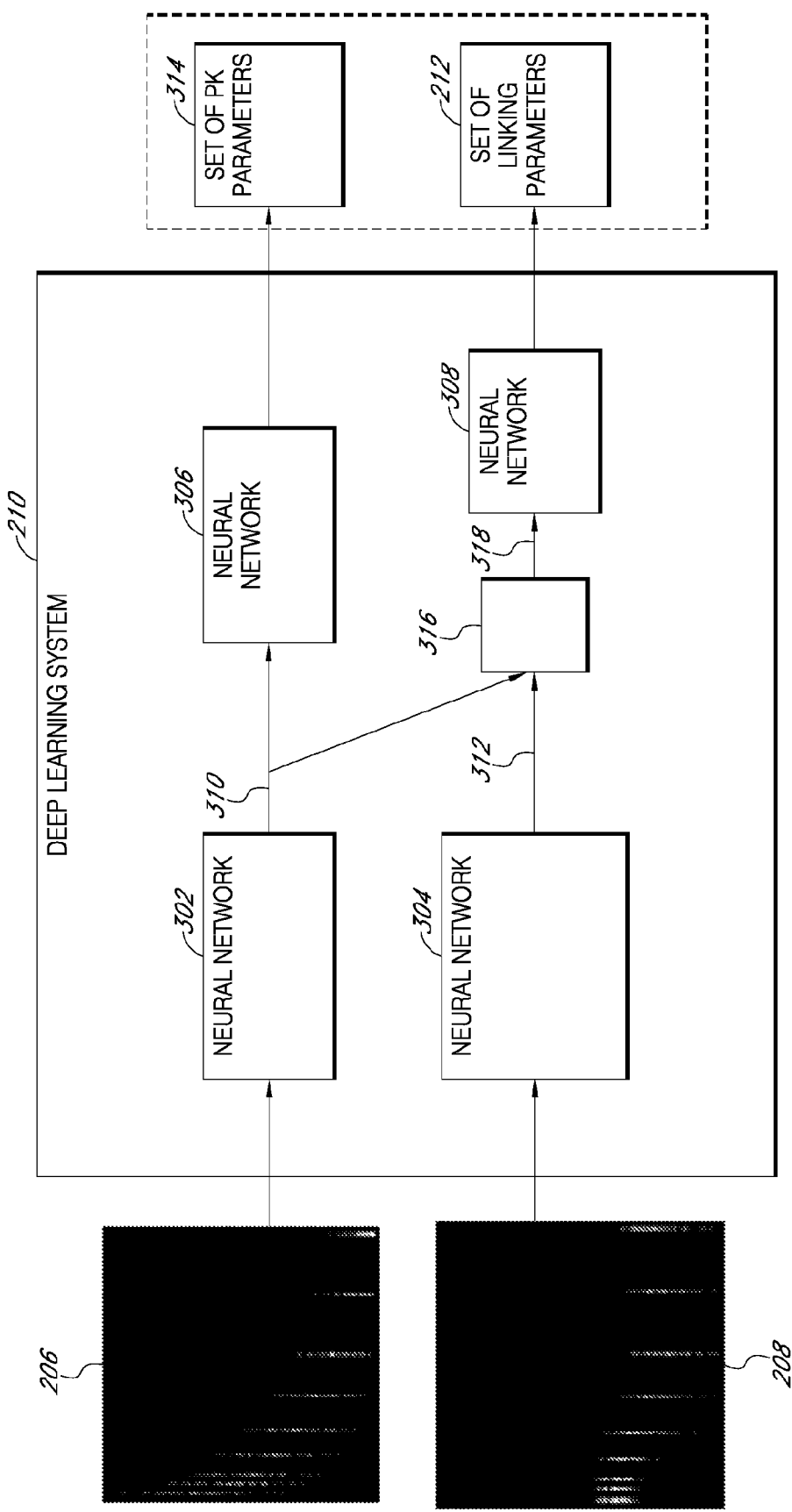
FIG. 3 is a schematic diagram of one example of a configuration for deep learning system from FIG. 2 in accordance with various embodiments.

FIG. 3 is a schematic diagram of one example of a configuration for deep learning system 210 from FIG. 2 in accordance with various embodiments. In one or more embodiments, deep learning system 210 includes at least four neural networks: a neural network 302, a neural network 304, a neural network 306, and a neural network 308. In other embodiments, deep learning system 210 may include some other number of or configuration of neural networks. In one or more embodiments, one or more of neural network 302, neural network 304, neural network 306, and neural network 308 are convolutional neural networks.

Neural network 302 may receive PK data density image 206 for processing. Neural network 304 may receive PD data density image 208 for processing. In one or more embodiments, PK data density image 206 and PD data density image 208 are binned intensity images. For example, PK data density image 206 may be a binned intensity image in which a pixel or pixel group for a particular drug concentration (concentration interval or range or "bin") and a particular point in time (or time interval or "bin") has an intensity that represents the density (e.g., number of instances) for that particular drug concentration (concentration interval or range or "bin") and particular point in time (or time interval or "bin"). For example, the higher the intensity of a given pixel or pixel group, the greater the number of instances (e.g., the number of test subjects) for which a same drug concentration (or drug concentration within a same interval or bin) was measured for the same point in time (or same period of time, time interval, or time bin).

Neural network 302 processes PK data density image 206 to generate PK model output 310; neural network 304 processes PD data density image 208 to generate PD model output 312. In one or more embodiments, PK model output 310 and PD model output 312 are the model parameters of neural network 302 and neural network 304, respectively. In other embodiments, PK model output 310 and PD model output 312 are some other type of output corresponding to PK data density image 206 and PD data density image 208, respectively. In one or more embodiments, PK model output 310 and PD model output 312 take the form of vectors.

PK model output 310 may be sent as input into neural network 306. In one or more embodiments, neural network 306 is a fully connected neural network. Neural network 306 processes PK model output 310 and generates set of PK parameters 314 as an output. Set of PK parameters 314 may include, for example, at least one of an area under the curve (AUC), a minimum concentration ($C_{min}$), or a maximum concentration ($C_{max}$).

In one or more embodiments, PK model output 310 and PD model output 312 are both sent into merge unit 316 to form merged input 318 that is sent into neural network 308. Merge unit 316 may be implemented using, for example, a catenation network or unit. In some embodiments, PK model output 310 and PD model output 312 are sent directly into neural network 308 as input and merged or catenated or concatenated in some manner within neural network 308. In one or more embodiments, neural network 308 is a multilayer perception network.

Neural network 308 processes its input (e.g., merged input 318 or both PK model output 310 and PD model output 312) to generate set of linking parameters 212 as previously described in FIG. 2. In some embodiments, set of PK parameters 314 and set of linking parameters 212 are merged to form a final output vector that comprises the values for the various PK and linking parameters predicted by deep learning system 210.

III. Example Methods for Predicting a Set of Linking Parameters

Figure 4:
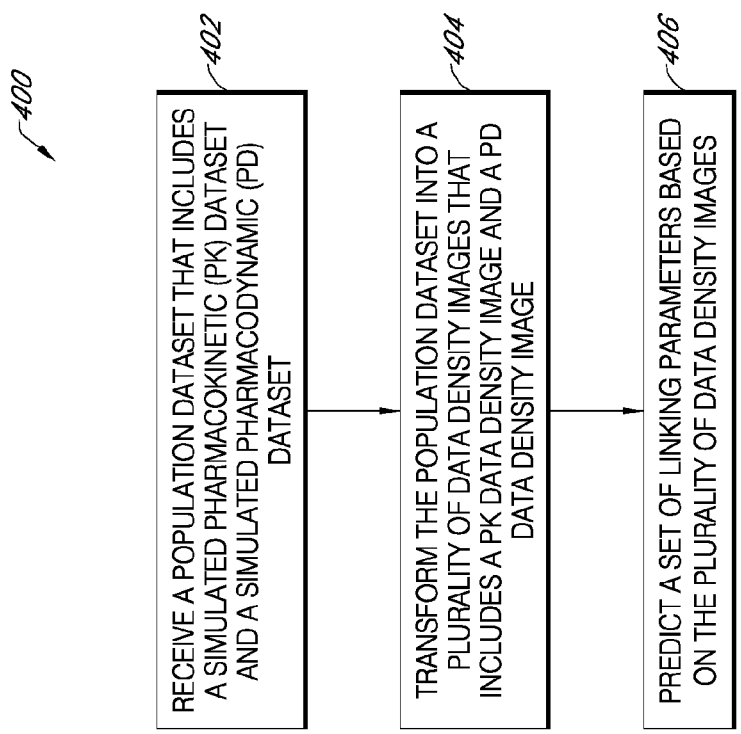
FIG. 4 is a flowchart of a method for predicting a set of linking parameters based on a population (PK/PD) dataset in accordance with various embodiments.

FIG. 4 is a flowchart of a method for predicting a set of linking parameters based on a population (PK/PD) dataset in accordance with various embodiments. In some embodiments, method 400 may be implemented via PK/PD evaluation system 100 described in FIG. 1.

Step 402 includes receiving, by one or more processors, a population dataset that comprises a population pharmacokinetic (PK) dataset and a population pharmacodynamic (PD) dataset. The population PK dataset may include, for example, dose effect (e.g., drug concentration) time series data. The population PD dataset may include, for example, drug effect (e.g., neutrophil count) time series data.

Step 404 includes transforming, by the one or more processors, the population dataset into a plurality of data density images that includes a PK data density image and a PD data density image. In one or more embodiments, the PK data density image and the PD data density image are binned intensity images. In one or more embodiments, the PK data density image is a binned intensity image in which each pixel value in at least a portion of the binned intensity image indicates a density of data points corresponding to a selected dose effect and a selected point in time. In one or more embodiments, the PD data density image is a binned intensity image in which each pixel value in at least a portion of the binned intensity image indicates a density of data points corresponding to selected dose effect and a selected point in time.

Step 406 includes predicting, by the one or more processors, the set of linking parameters using the plurality of data density images. A linking parameter in the set of linking parameters provides correspondence or otherwise links the population PK dataset and the population PD dataset. In one or more embodiments, the set of linking parameters may include at least one of a slope, a half-maximal effective concentration ($EC_{50}$), or a maximum effect ($E_{max}$).

Figure 5:
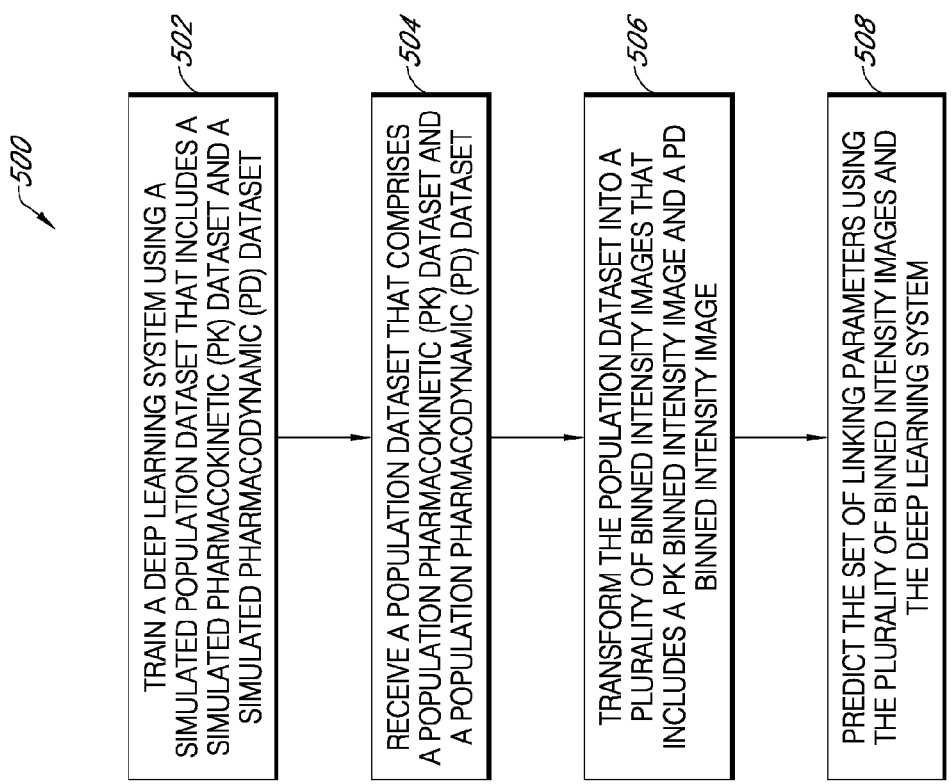
FIG. 5 is a flowchart of a method for predicting a set of linking parameters based on a population PK/PD dataset in accordance with various embodiments.

FIG. 5 is a flowchart of a method for predicting a set of linking parameters based on a population PK/PD dataset in accordance with various embodiments. In some embodiments, method 500 may be implemented via PK/PD evaluation system 100 described in FIG. 1.

Step 502 includes training, by one or more processors, a deep learning system using a simulated population dataset that includes a simulated pharmacokinetic (PK) dataset and a simulated pharmacodynamic (PD) dataset. The simulated PK dataset and the simulated PD dataset may be population-level datasets that are generated in various ways and using any number of or combination of models.

Step 504 includes receiving, by the one or more processors, a population dataset that comprises a population pharmacokinetic (PK) dataset and a population pharmacodynamic (PD) dataset. The population dataset may be a real-life or clinical dataset in some embodiments.

Step 506 includes transforming, by the one or more processors, the population dataset into a plurality of binned intensity images that includes a PK binned intensity image and a PD binned intensity image. The binned intensity images each comprise pixels in which the value of a given pixel indicates a density of data points in the dataset from which that binned intensity image was generated for a selected effect (e.g., for PK—dose effect; for PD—drug effect) for a selected point in time.

Step 508 includes predicting, by the one or more processors, the set of linking parameters using the plurality of binned intensity images and the deep learning system. The set of linking parameters may include at least one of a slope, a half-maximal effective concentration ($EC_{50}$), or a maximum effect ($E_{max}$).

Figure 6:
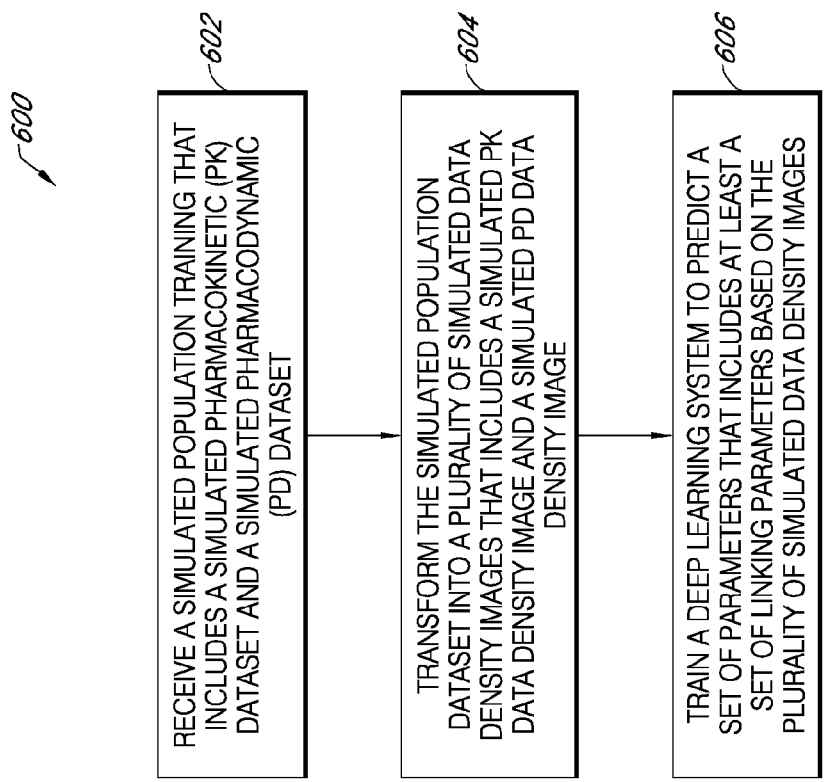
FIG. 6 is a flowchart of a method for training a deep learning system to predict a set of linking parameters based on a population PK/PD dataset in accordance with various embodiments.

IV. Training a Deep Learning System Using Simulated Population PK and PD Data FIG. 6 is a flowchart of a method 600 for training a deep learning system to predict a set of linking parameters based on a population PK/PD dataset in accordance with various embodiments. Method 600 is one example of a manner in which step 502 in FIG. 5 may be performed. Further, method 600 may be implemented via PK/PD evaluation system 100 described in FIG. 1.

Step 602 includes receiving a simulated population training that includes a simulated pharmacokinetic (PK) dataset and a simulated pharmacodynamic (PD) dataset. The simulated PK dataset and the simulated PD dataset may be population-level datasets that are generated in various ways and using any number of or combination of models.

Step 604 includes transforming the simulated population dataset into a plurality of simulated data density images that includes a simulated PK data density image and a simulated PD data density image. The plurality of simulated data density images may include, for example, binned intensity images.

Step 606 includes training a deep learning system to predict a set of parameters that includes at least a set of linking parameters based on the plurality of simulated data density images. Step 606 may be performed in various ways. In one or more embodiments, step 606 may include initializing of a self-organizing neural network of the deep learning system to enable training.

Figure 7:
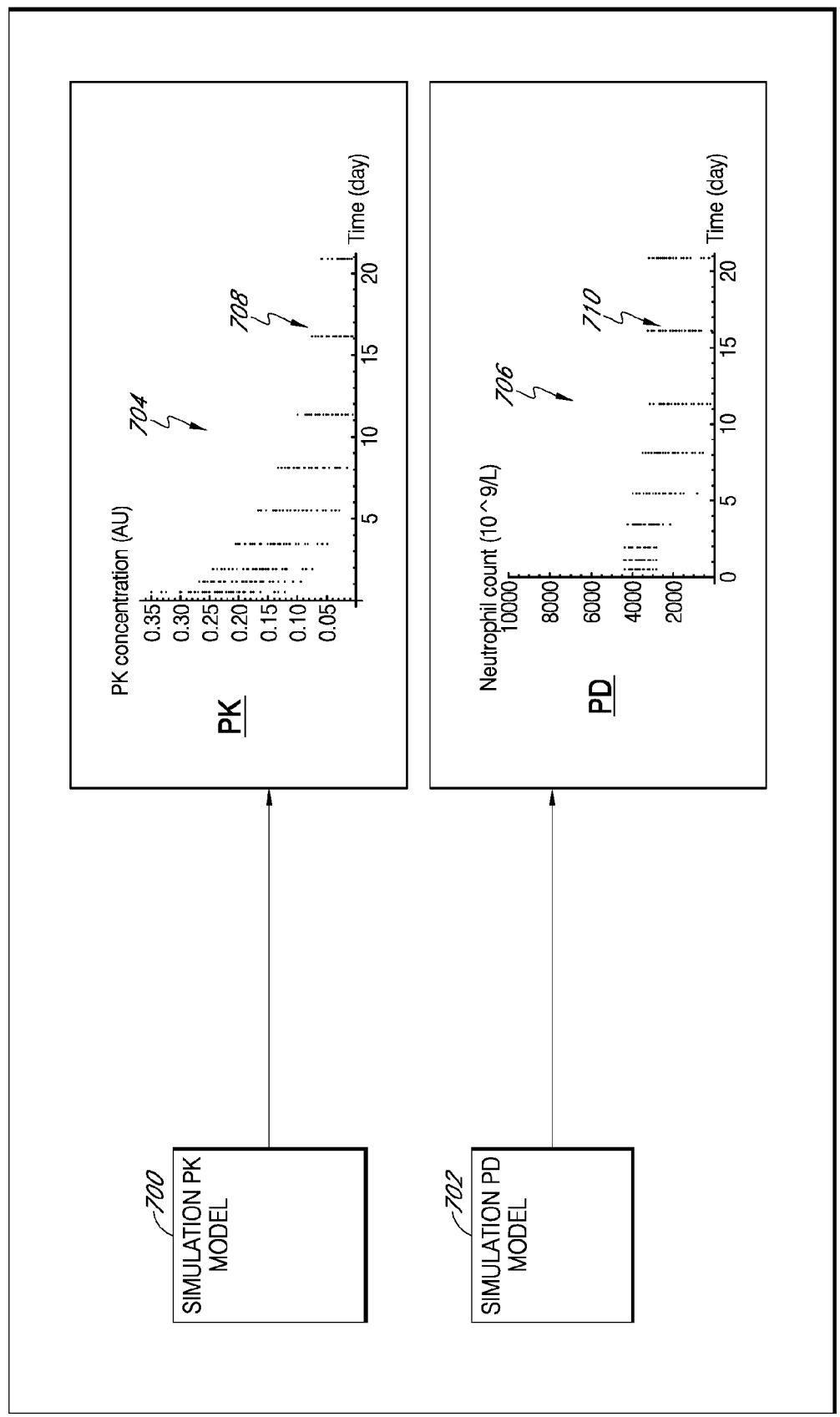
FIG. 7 is a schematic diagram illustration the simulation of a population dataset in accordance with various embodiments.

FIG. 7 is a schematic diagram illustration the simulation of a population dataset in accordance with various embodiments. Simulation PK model 700 and simulation PD model 702 may be used to generate simulated PK dataset 704 and simulated PD dataset 706, respectively. Simulation PK model 700 and simulation PD model 702 may generate these simulated datasets based on the effects associated with one or more therapeutics (drugs).

Simulated PK dataset 704 may also be referred to as a simulated population PK dataset and simulated PD dataset 706 may also be referred to as a simulated population PD dataset. For example, simulated PK dataset 704 may simulate a drug concentration over time (e.g., with respect to discrete points in time). Simulated PD dataset 706 may simulate a drug effect (e.g., neutrophil count or some other effect) over time (e.g., with respect to discrete points in time). Simulated PK dataset 704 and simulated PD dataset 706 are generated as time series datasets based on sampling times 708 and sampling times 710, respectively. In one or more embodiments, sampling times 708 and sampling times 710 are the same or are aligned.

Each of simulation PK model 700 and simulation PD model 702 may be customized with model parameters such that the corresponding simulation model generates one or more discrete time series (or time series datasets). Each discrete time series may be representative of the data (e.g., PK or PD) for one simulated dosing of a therapeutic drug on a simulated test subject. In one or more embodiments, simulated PK dataset 704 and simulated PD dataset 706 each include multiple time series for a simulated population. In some embodiments, simulation PK model 700, simulation PD model 702, or both supplement simulated data with real-life or clinical data points to form simulated PK dataset 704, simulated PD dataset 706, or both, respectively.

Simulation PD model 702 may be implemented in various ways. In one or more embodiments, simulation PD model 702 may be implemented using at least one of a one-compartment model, a two-compartment model, a Michaelis-Menten two-compartment model, or another type of model.

For PK one-compartment models, the model parameters for simulation PK model 700 may be customized to include but are not limited to: volume of distribution for the central compartment, absorption rate into central compartment, elimination rate from the central compartment, one or more other types of parameters, or a combination thereof. For PK two-compartment models, the model parameters for simulation PK model 700 may be customized to include but are not limited to: volume of distribution for the central compartment, volume of distribution for the peripheral compartment, absorption rate into central compartment, elimination rate from the central compartment, inter-compartmental clearance between central and peripheral compartments, one or more other types of model parameters, or a combination thereof.

For Michaelis-Menten PK two-compartment models, the model parameters for simulation PK model 700 may be customized to include, but are not limited to: volume of distribution for the central compartment, volume of distribution for the peripheral compartment, absorption rate into central compartment, elimination rate from the central compartment, inter-compartmental clearance between central and peripheral compartments, Michaelis-Menton constants associated with the non-linear clearance mechanism, one or more other types of model parameters, or a combination thereof.

Simulation PD model 702 may be implemented in various ways. For example, simulation PD model 702 may be implemented using at least one of an indirect response model (i.e., Inhibition $k_{in}$, Inhibition $k_{out}$, Stimulation $k_{in}$, Stimulation $k_{out}$, or a combination thereof), a biophase model, a signal transduction models, or some other type of simulation model.

Simulated PK dataset 704 and simulated PD dataset 706 may be transformed into simulated data density images (e.g., binned intensity images) in a manner similar to the transformation of population PK dataset 202 and population PD dataset 204 into PK data density image 206 and PD data density image 208, respectively, in FIG. 2. Deep learning system 210 described in FIG. 2 may be trained using these simulated data density images.

Figure 8:
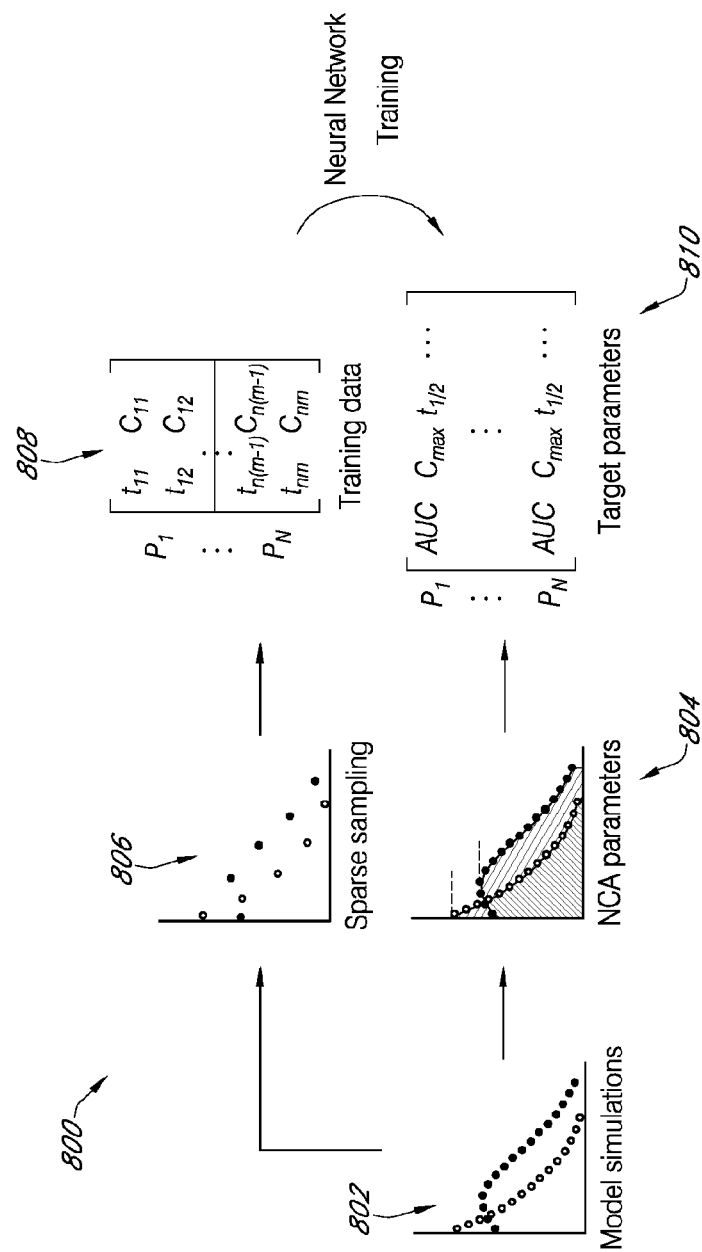
FIG. 8 is an illustration of an example training workflow in accordance with various embodiments.

FIG. 8 is an illustration of an example training workflow 800 in accordance with various embodiments. Training workflow 800 is a high-level illustration of how simulated PK data can be generated and used to create training datasets.

As depicted herein, simulated time-series concentration data 802 is generated using one or more types of PK compartmental models. This involves first setting (by inputting) one or more PK compartmental model simulation parameters and then running the PK compartmental model simulation to generate simulated time-series concentration data 802 for one or more existing or potential future therapeutic agents.

Examples of PK compartmental model simulation parameters include, but are not limited to: dosing scheme (e.g., subcutaneous, oral, intravenous, etc.), molecular class (e.g., small molecule or large molecule), molecular species (e.g., drug, mAbs, protein, enzyme, etc.), compartmental model specific parameters (e.g., volume of distribution for the central compartment, absorption constants, elimination constants, etc.), modeled species (e.g., mammalian, rodents, human, non-human primates, etc.), modeled species demographics (e.g., age, weight, gender etc.), baseline albumin, baseline tumor size, etc.

In various embodiments, a one-compartment model can be used to simulate the time-series concentration data 802. For PK one-compartment models, the compartmental parameters that can be set include, but are not limited to: volume of distribution for the central compartment, absorption rate into central compartment, elimination rate from the central compartment, etc.

In various embodiments, a two-compartment model can be used to simulate the time-series concentration data 802. For PK two-compartment models, the compartmental parameters that can be set include, but are not limited to: volume of distribution for the central compartment, volume of distribution for the peripheral compartment, absorption rate into central compartment, elimination rate from the central compartment, inter-compartmental clearance between central and peripheral compartments, etc.

In various embodiments, a Michaelis-Menten PK two-compartment model can be used to simulate the time-series concentration data 802. For Michaelis-Menten PK two-compartment models, the compartmental parameters that can be set include, but are not limited to: volume of distribution for the central compartment, volume of distribution for the peripheral compartment, absorption rate into central compartment, elimination rate from the central compartment, inter-compartmental clearance between central and peripheral compartments, Michaelis-Menton constants associated with the non-linear clearance mechanism, etc.

After the simulated time-series concentration data 802 is generated, it is sparsely sampled 806 to form a subset of simulated time-series concentration training datasets 808 and each of the simulated time-series concentration training datasets 808 is further processed using non-compartmental analysis (NCA) 804 to calculate their corresponding simulated PK parameter values 810. Examples of the types of simulated PK parameter values include, but are not limited to: AUC, $C_{max}$, $C_{min}$, $C_{trough}$, $T_{max}$, MRT, $T_{Last}$, or $t_{1/2}$.

Figure 9:
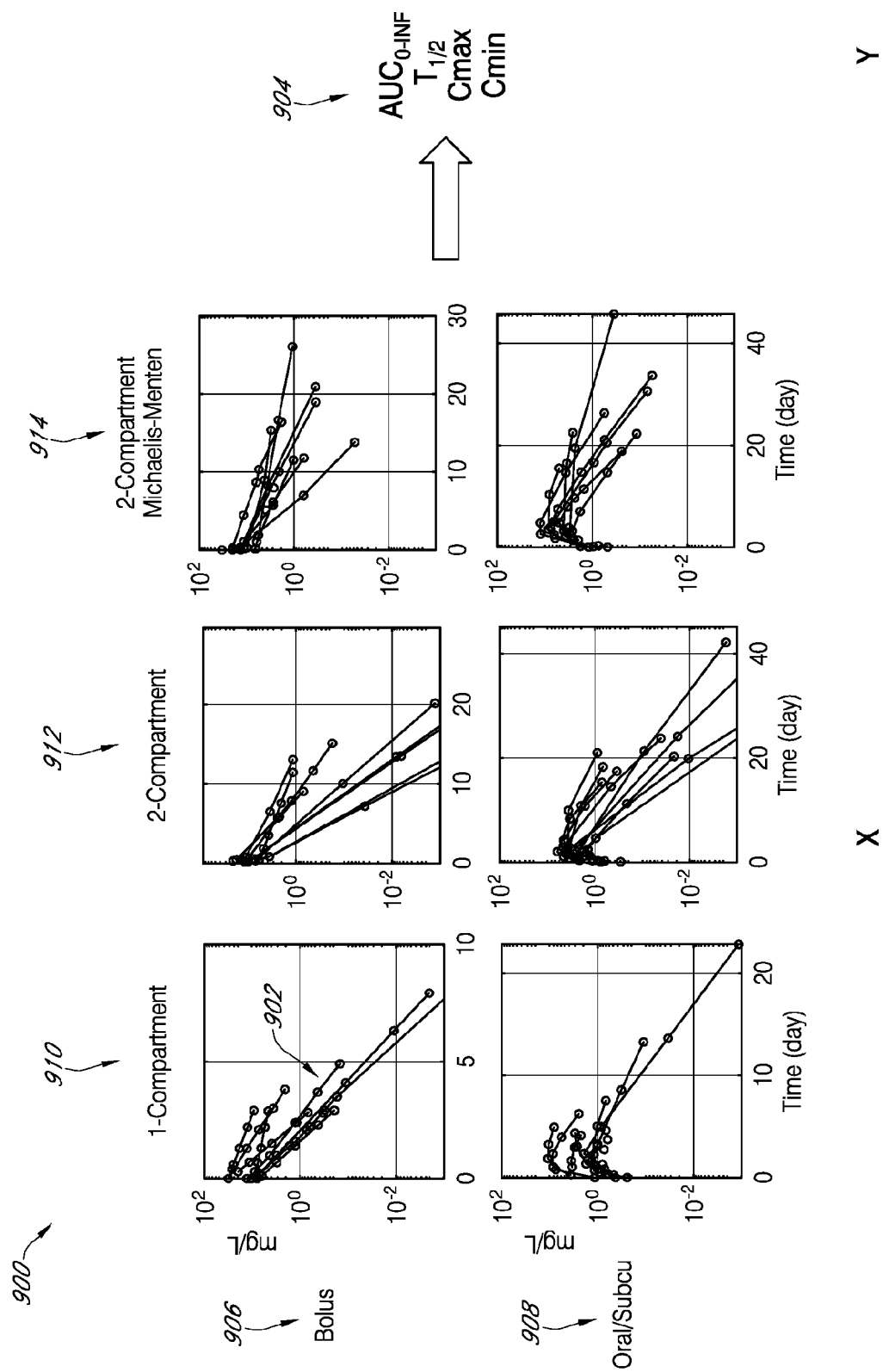
FIG. 9 is an illustration of a series of plots for various forms of compartment modeling in accordance with various embodiments.

FIG. 9 is an illustration of a series of plots 900 for various forms of compartment modeling in accordance with various embodiments. Series of plots 900 illustrate how compartmental modeling can be used to simulate time-series concentration data that is coupled with PK parameters predicted using NCA to form training datasets, in accordance with various embodiments.

In the example illustrated in FIG. 9, three different compartmental models (i.e., 1-Compartment 910, 2-Compartment 912 and 2-Compartment Michaelis-Menten 914) were used to generate simulated time-series concentration datasets 902. The same compartmental model simulations were run using different therapeutic dosing scheme settings (i.e., bolus 906 and oral/subcutaneous 908) to illustrate the effects of dosing scheme on the simulated time-series concentration datasets 902.

As discussed above, after the simulated time-series concentration datasets 902 are generated, they are further processed using NCA to calculate their corresponding simulated PK parameter values 904. In various embodiments, the simulated time-series concentration datasets are of one or more existing or potential future therapeutic agents.

V. Experimental Results

The improved systems and methods, disclosed herein, were compared against conventional approaches for predicting population PK/PD linking parameter values for an agent (e.g., drug).

Figure 10:
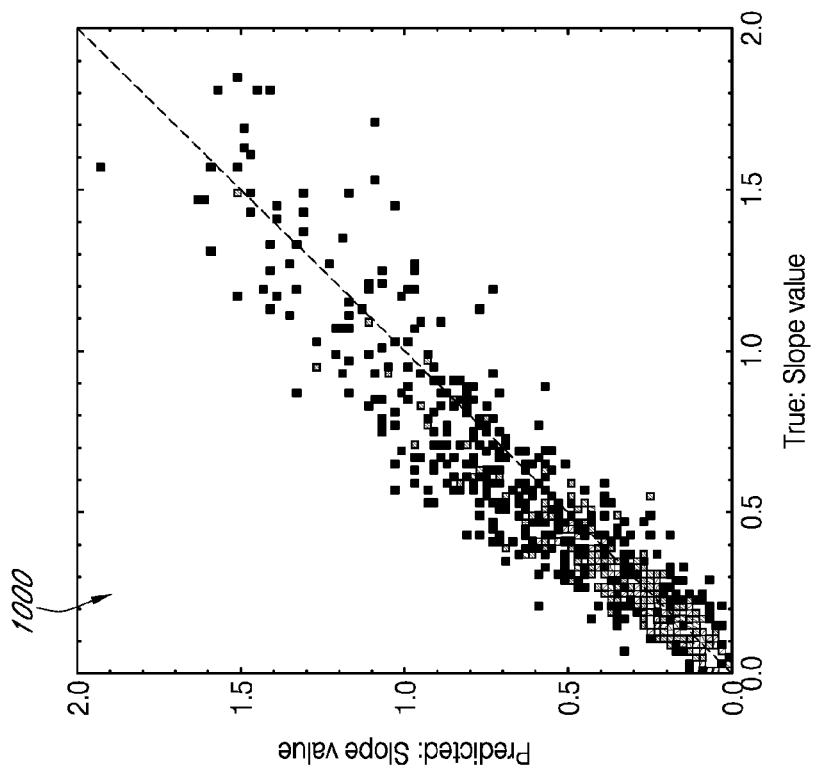
FIG. 10 is an illustration of a plot that demonstrates the accuracy of estimating a linking parameter that relates PK and PD effects using methodologies described above in accordance with various embodiments.

FIG. 10 is an illustration of a plot 1000 that demonstrates the accuracy of estimating a linking parameter that relates PK and PD effects using methodologies described above in accordance with various embodiments. As shown in plot 1000, the "true" linking parameter values (e.g., population PK/PD linking parameter values) were plotted against the "estimated" or "predicted" linking parameter values generated via the image-based NN predictive methodologies disclosed above for 1000 samples. In plot 1000, the linking parameter is slope, which related drug effect versus drug concentration. Plot 1000 illustrates that the true slope and estimated slope were closely correlated with each other across the entire range of slope values. Thus, the image-based NN predictive methodologies described herein can accurately estimate or predict linking parameter that relate PK and PD across the range of linking parameter values.

VI. Computer-Implemented System

Figure 11:
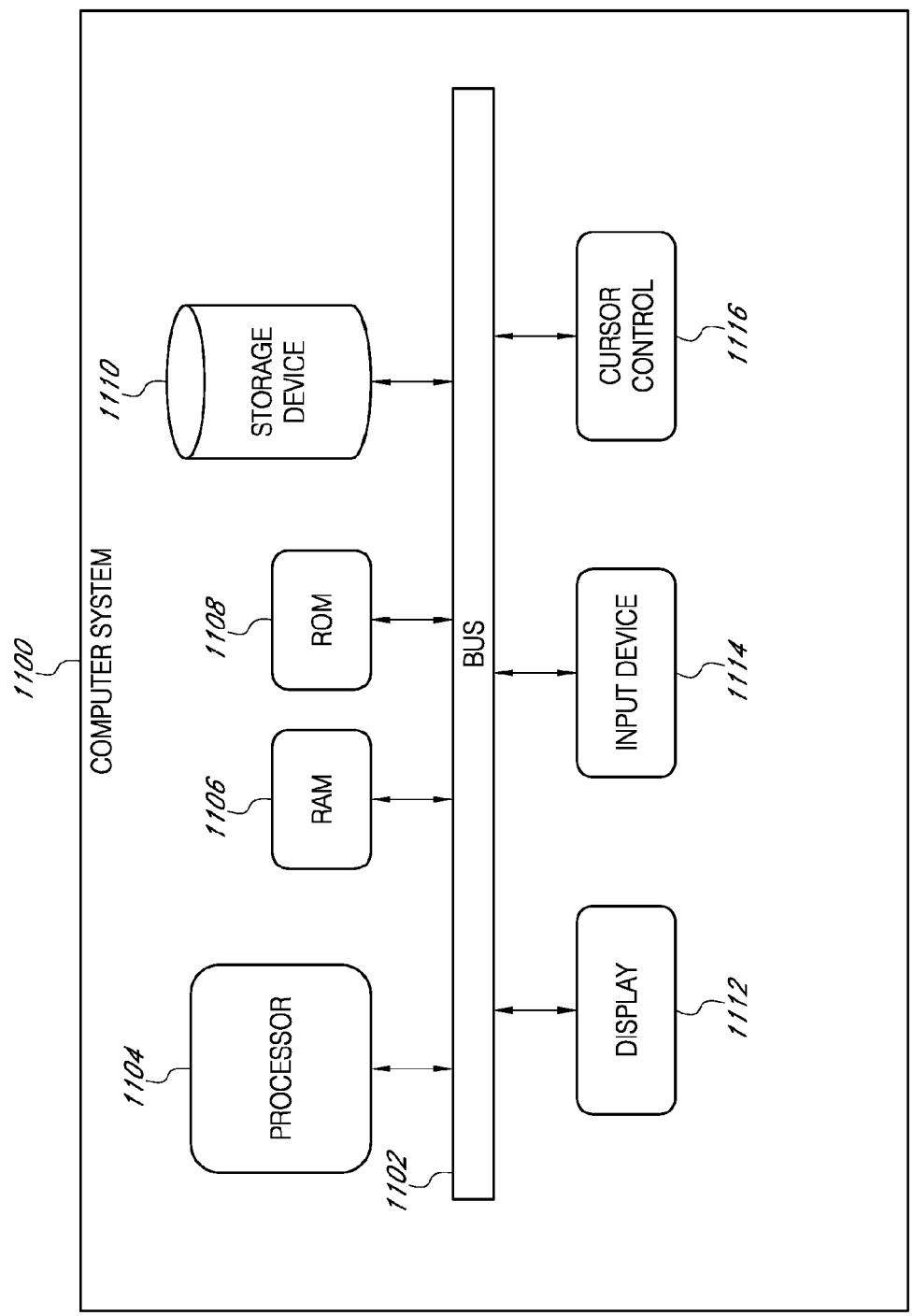
FIG. 11 is a block diagram that illustrates a computer system, in accordance with various embodiments.

FIG. 11 is a block diagram that illustrates a computer system, in accordance with various embodiments. Computer system 1100 may be one example of an implementation for computing device 93 in FIG. 1. In various embodiments of the present teachings, computer system 1100 can include a bus 1102 or other communication mechanism for communicating information, and a processor 1104 coupled with bus 1102 for processing information. In various embodiments, computer system 1100 can also include a memory, which can be a random access memory (RAM) 1106 or other dynamic storage device, coupled to bus 1102 for determining instructions to be executed by processor 1104. Memory also can be used for storing temporary variables or other intermediate information during execution of instructions to be executed by processor 1104. In various embodiments, computer system 1100 can further include a read only memory (ROM) 1108 or other static storage device coupled to bus 1102 for storing static information and instructions for processor 1104. A storage device 1110, such as a magnetic disk or optical disk, can be provided and coupled to bus 1102 for storing information and instructions.

In various embodiments, computer system 1100 can be coupled via bus 1102 to a display 1112, such as a cathode ray tube (CRT) or liquid crystal display (LCD), for displaying information to a computer user. An input device 1114, including alphanumeric and other keys, can be coupled to bus 1102 for communicating information and command selections to processor 1104. Another type of user input device is a cursor control 1116, such as a mouse, a trackball or cursor direction keys for communicating direction information and command selections to processor 1104 and for controlling cursor movement on display 1112. This input device 1114 typically has two degrees of freedom in two axes, a first axis (i.e., x) and a second axis (i.e., y), that allows the device to specify positions in a plane. However, it should be understood that input devices 1114 allowing for 3-dimensional (x, y and z) cursor movement are also contemplated herein.

Consistent with certain implementations of the present teachings, results can be provided by computer system 1100 in response to processor 1104 executing one or more sequences of one or more instructions contained in memory 1106. Such instructions can be read into memory 1106 from another computer-readable medium or computer-readable storage medium, such as storage device 1110. Execution of the sequences of instructions contained in memory 1106 can cause processor 1104 to perform the processes described herein. Alternatively, hard-wired circuitry can be used in place of or in combination with software instructions to implement the present teachings. Thus, implementations of the present teachings are not limited to any specific combination of hardware circuitry and software.

The term "computer-readable medium" (e.g., data store, data storage, etc.) or "computer-readable storage medium" as used herein refers to any media that participates in providing instructions to processor 1104 for execution. Such a medium can take many forms, including but not limited to, non-volatile media, volatile media, and transmission media. Examples of non-volatile media can include, but are not limited to, optical, solid state, magnetic disks, such as storage device 1110. Examples of volatile media can include, but are not limited to, dynamic memory, such as memory 1106. Examples of transmission media can include, but are not limited to, coaxial cables, copper wire, and fiber optics, including the wires that comprise bus 1102.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, or any other tangible medium from which a computer can read.

In addition to computer readable medium, instructions or data can be provided as signals on transmission media included in a communications apparatus or system to provide sequences of one or more instructions to processor 1104 of computer system 1100 for execution. For example, a communication apparatus may include a transceiver having signals indicative of instructions and data. The instructions and data are configured to cause one or more processors to implement the functions outlined in the disclosure herein.

Representative examples of data communications transmission connections can include, but are not limited to, telephone modem connections, wide area networks (WAN), local area networks (LAN), infrared data connections, NFC connections, etc.

It should be appreciated that the methodologies described herein flow charts, diagrams and accompanying disclosure can be implemented using computer system 1100 as a standalone device or on a distributed network of shared computer processing resources such as a cloud computing network.

The methodologies described herein may be implemented by various means depending upon the application. For example, these methodologies may be implemented in hardware, firmware, software, or any combination thereof. For a hardware implementation, the processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

In various embodiments, the methods of the present teachings may be implemented as firmware and/or a software program and applications written in conventional programming languages such as C, C++, Python, etc. If implemented as firmware and/or software, the embodiments described herein can be implemented on a non-transitory computer-readable medium in which a program is stored for causing a computer to perform the methods described above. It should be understood that the various engines described herein can be provided on a computer system, such as computer system 1100, whereby processor 1104 would execute the analyses and determinations provided by these engines, subject to instructions provided by any one of, or a combination of, memory components 1106/1108/1110 and user input provided via input device 1114.

VII. Exemplary Embodiments

Various exemplary embodiments are described herein.

In one or more embodiments, a system is provided for predicting a set of linking parameters that relate pharmacokinetic and pharmacodynamic effects. The system comprises a data storage, a computing device communicatively connected to the data storage, and a display system communicatively connected to the computing device. The data storage is configured to store a population dataset that comprises a population pharmacokinetic (PK) dataset and a population pharmacodynamic (PD) dataset. The computing device comprises a data manager and a prediction system. The data manager is configured to receive the population dataset and to transform the population dataset into a plurality of data density images that includes a PK data density image and a PD data density image. The prediction system is configured to predict the set of linking parameters using the plurality of data density images. The display system is configured to display a report containing a predicted value for each linking parameter of the set of linking parameters.

In one or more embodiments, a non-transitory computer-readable medium storing computer instructions for predicting a population linking parameter value comprises instructions for: receiving a population dataset that comprises a population pharmacokinetic (PK) dataset and a population pharmacodynamic (PD) dataset; transforming the population dataset into a plurality of data density images that includes a PK data density image and a PD data density image; and predicting the set of linking parameters using the plurality of data density images.

In one or more embodiments, a non-transitory computer-readable medium storing computer instructions for predicting a population linking parameter value comprises instructions for: receiving a population dataset that comprises a population pharmacokinetic (PK) dataset and a population pharmacodynamic (PD) dataset; transforming the population dataset into a plurality of binned intensity images that includes a PK binned intensity image and a PD binned intensity image; and predicting the set of linking parameters using the plurality of binned intensity images and a deep learning system that comprises at least one neural network.

In one or more embodiments, a method is provided for training a deep learning system to predict one or more linking parameters. The method includes receiving simulated population training that includes a simulated pharmacokinetic (PK) dataset and a simulated pharmacodynamic (PD) dataset. The simulated PK dataset and the simulated PD dataset may be population-level datasets that are generated in various ways and using any number of or combination of models. The method includes transforming the simulated population dataset into a plurality of simulated data density images that includes a simulated PK data density image and a simulated PD data density image. The method includes training the deep learning system to predict a set of parameters that includes at least a set of linking parameters based on the plurality of simulated data density images.

In one or more embodiments, the PK data density image of one or more of the exemplary embodiments described herein is a binned intensity image in which each pixel value in at least a portion of the binned intensity image indicates a density of data points corresponding to a selected dose effect and a selected point in time.

In one or more embodiments, the PD data density image of one or more of the exemplary embodiments described herein is a binned intensity image in which each pixel value in at least a portion of the binned intensity image indicates a density of data points corresponding to selected dose effect and a selected point in time.

In one or more embodiments, the set of linking parameters of one or more of the exemplary embodiments described herein comprises at least one of a slope, a half-maximal effective concentration ($EC_{50}$), or a maximum effect ($E_{max}$).

In one or more embodiments, one or more of the exemplary method embodiments described herein includes predicting, by the one or more processors, a set of PK parameters using the PK data density image, wherein the set of PK parameters comprises at least one of an area under the curve (AUC), a minimum concentration ($C_{min}$), or a maximum concentration ($C_{max}$).

In one or more embodiments, predicting the set of linking parameters in one or more of the exemplary method embodiments described herein includes predicting, by the one or more processors, the set of linking parameters using the plurality of data density images and a deep learning system.

In one or more embodiments, the deep learning system of one or more of the exemplary embodiments described herein comprises a neural network system.

In one or more embodiments, the deep learning system of one or more of the exemplary embodiments described herein comprises at least one convolutional neural network.

In one or more embodiments, one or more of the exemplary embodiments described herein includes training a deep learning system for use in predicting the set of linking parameters, wherein the training is performed using a simulated PK dataset and a simulated PD dataset.

In one or more embodiments, the data storage and the computing device of one or more of the exemplary embodiments described herein are part of an integrated apparatus.

In one or more embodiments, the data storage of one or more of the exemplary embodiments described herein is hosted by a different device than the computing device of one or more of the exemplary embodiments described herein.

In one or more embodiments, the data storage and the computing device of one or more of the exemplary embodiments described herein are part of a distributed network system.

VIII. Additional Considerations

The teachings described herein are not limited to the exemplary embodiments and applications or their manner of operation, as described herein. Further, section divisions in the specification are for ease of review only and do not limit any combination of elements discussed. In describing the various embodiments, the specification may have presented a method and/or process as a particular sequence of steps. However, to the extent that the method or process does not rely on the particular order of steps set forth herein, the method or process should not be limited to the particular sequence of steps described, and one skilled in the art can readily appreciate that the sequences may be varied and still remain within the spirit and scope of the various embodiments. In addition, where reference is made to a list of elements (e.g., elements a, b, c), such reference is intended to include any one of the listed elements by itself, any combination of less than all of the listed elements, and/or a combination of all of the listed elements.

The figures may show simplified or partial views, and the dimensions of elements in the figures may be exaggerated or otherwise not in proportion. In addition, as the terms "on," "attached to," "connected to," "coupled to," or similar words are used herein, one element (e.g., a material, a layer, a substrate, etc.) can be "on," "attached to," "connected to," or "coupled to" another element regardless of whether the one element is directly on, attached to, connected to, or coupled to the other element or there are one or more intervening elements between the one element and the other element.

Unless otherwise defined, scientific and technical terms used in connection with the present teachings described herein shall have the meanings that are commonly understood by those of ordinary skill in the art. Further, unless otherwise required by context, singular terms shall include pluralities and plural terms shall include the singular. Generally, nomenclatures utilized in connection with, and techniques of, chemistry, biochemistry, molecular biology, pharmacology and toxicology as described herein are those well-known and commonly used in the art.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent.

The term "ones" means more than one.

As used herein, the term "plurality" can be 2, 3, 4, 5, 6, 7, 8, 9, 10, or more.

As used herein, the phrase "Area Under the Curve" (AUC) may refer to an area of a curve that describes the variation of a therapeutic (drug) concentration in subject blood plasma as a function of time post administration.

As used herein, the phrase "Maximum Concentration" ($C_{max}$) may refer to a maximum (or peak) serum concentration that a therapeutic (drug) achieves in a specified compartment or test area of the body after the drug has been administrated and before the administration of a second dose.

As used herein, the phrase "Minimum Concentration" ($C_{min}$) or "Trough Concentration" ($C_{trough}$) may refer to a minimum (or peak) serum concentration that a therapeutic (drug) achieves in a specified compartment or test area of the body after the drug has been administrated and before the administration of a second dose.

As used herein, the term "Time of Maximum Concentration" ($T_{max}$) may refer to a time when maximum concentration is reached after a therapeutic (drug) dose is administered and before a next dose is administered.

As used herein, the term "Half-life" ($t_{1/2}$) may refer to a time that it takes for a concentration of a therapeutic (drug) in blood plasma to reach one-half of its steady-state value.

As used herein, the phrase "minimum inhibitory concentration" (MIC) may refer to a lowest concentration of an antibiotic that completely inhibits the growth of a microorganism in vitro.

As used herein, the phrase "maximum effective concentration" ($E_{max}$) may refer to a maximum pharmacological effect provided by a therapeutic (drug).

As used herein, the phrase "half maximal effective concentration" ($EC_{50}$) may refer to a concentration of a therapeutic (drug) at which 50% of the maximum pharmacological effect is achieved.

As used herein, the phrase "compartmental model" or "compartment modelling" may refer to one or more mathematical modelling techniques used for predicting PK parameters (indicative of the ADME) of synthetic or natural therapeutic (drug) in a test subject by modelling concentrations of the therapeutic in different areas of the body. Within these mathematical models, the different areas of the body can be divided into parts, called compartments, where the therapeutic can be assumed to behave in the same manner.

As used herein, the phrase "non-compartmental model" (NCA) may refer to one or more model-independent techniques (meaning they do not rely upon assumptions about body compartments) used for predicting PK parameters (indicative of the ADME) of a therapeutic (drug) administered to a test subject. NCA enables the computation of PK parameters of a therapeutic (drug) from the time course of measured drug concentrations.

As used herein, a "biologic" or "large molecule therapeutic" may refer to proteins and other biological macromolecules that have a therapeutic effect.

As used herein, "therapeutics compound" or "small molecule therapeutic" may refer to any organic compound that affects a biologic process with a relatively low molecular weight, below 900 daltons.

As used herein, an "artificial neural network" or "neural network" (NN) may refer to mathematical algorithms or computational models. Neural networks can employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

A neural network may process information in two ways: when it is being trained it may be in "learning mode" and when it puts what it has learned into practice it may be in "inference (or prediction) mode." Neural networks may learn through a feedback process called backpropagation which allows the network to adjust the weight factors (modifying its behavior) of the individual nodes in the intermediate hidden layers so that the output matches the outputs of the training data. In other words, a neural network may receive training data (learning examples) and automatically learn how to reach the correct output, even when it is presented with a new range or set of inputs. Examples of the types of neural networks, include, but are not limited to: Feedforward Neural Network (FNN), Recurrent Neural Network (RNN), Modular Neural Network (MNN), Convolutional Neural Network (CNN), Residual Neural Network (ResNet), etc.

Thus, while the present teachings are described in conjunction with various embodiments, it is not intended that the present teachings be limited to such embodiments. On the contrary, the present teachings encompass various alternatives, modifications, and equivalents, as will be appreciated by those of skill in the art.

What is claimed is:

1. A method for predicting a set of linking parameters that relate pharmacokinetic and pharmacodynamic effects, the method comprising:
    receiving, by one or more processors, a population dataset that comprises a population pharmacokinetic (PK) dataset and a population pharmacodynamic (PD) dataset;
    transforming, by the one or more processors, the population dataset into a plurality of data density images that includes a PK data density image and a PD data density image, wherein the PK data density image reflects densities of data points corresponding to selected dose effects and selected points in time, and wherein the PD data density image reflects densities of data points corresponding to selected drug effects and selected points in time; and
    predicting, by the one or more processors, the set of linking parameters using the plurality of data density images and a deep learning system, wherein the deep learning system takes the plurality of data density images as input and outputs the predicted set of linking parameters, wherein the deep learning system is trained using a simulated PK dataset and a simulated PD dataset, and wherein the simulated PK dataset is generated based on a simulation of drug concentration with respect to points in time and the simulated PD dataset is generated based on a simulation of drug effect with respect to points in time.

2. The method of claim 1, wherein the PK data density image is a binned intensity image in which each pixel value in at least a portion of the binned intensity image indicates a density of data points corresponding to a selected dose effect and a selected point in time.

3. The method of claim 1, wherein the PD data density image is a binned intensity image in which each pixel value in at least a portion of the binned intensity image indicates a density of data points corresponding to selected dose effect and a selected point in time.

4. The method of claim 1, wherein the set of linking parameters comprises at least one of a slope, a half-maximal effective concentration ($EC_{50}$), or a maximum effect ($E_{max}$).

5. The method of claim 1, further comprising:
    predicting, by the one or more processors, a set of PK parameters using the PK data density image, wherein the set of PK parameters comprises at least one of an area under the curve (AUC), a minimum concentration ($C_{min}$), or a maximum concentration ($C_{max}$).

6. The method of claim 1, wherein the deep learning system comprises a neural network system.

7. The method of claim 1, wherein the deep learning system comprises at least one convolutional neural network.

8. The method of claim 1, further comprising:
    training the deep learning system for use in predicting the set of linking parameters, using the simulated PK dataset and the simulated PD dataset.

9. A system for predicting a set of linking parameters that relate pharmacokinetic and pharmacodynamic effects, the system comprising:
    a data store for storing a population dataset that comprises a population pharmacokinetic (PK) dataset and a population pharmacodynamic (PD) dataset; and
    a computing device communicatively connected to the data store and comprising:
        a data manager configured to receive the population dataset and to transform the population dataset into a plurality of data density images that includes a PK data density image and a PD data density image, wherein the PK data density image reflects densities of data points corresponding to selected dose effects and selected points in time, and wherein the PD data density image reflects densities of data points corresponding to selected drug effects and selected points in time; and
        a prediction system configured to predict the set of linking parameters using the plurality of data density images and a deep learning system, wherein the deep learning system takes the plurality of data density images as input and outputs the predicted set of linking parameters, wherein the deep learning system is trained using a simulated PK dataset and a simulated PD dataset, and wherein the simulated PK dataset is generated based on a simulation of drug concentration with respect to points in time and the simulated PD dataset is generated based on a simulation of drug effect with respect to points in time; and
    a display system communicatively connected to the computing device and configured to display a report containing a predicted value for each linking parameter of the set of linking parameters.

10. The system of claim 9, wherein the PK data density image is a binned intensity image in which each pixel value in at least a portion of the binned intensity image indicates a density of data points corresponding to a selected dose effect and a selected point in time.

11. The system of claim 9, wherein the PD data density image is a binned intensity image in which each pixel value in at least a portion of the binned intensity image indicates a density of data points corresponding to selected dose effect and a selected point in time.

12. The system of claim 9, wherein the set of linking parameters comprises at least one of a slope, a half-maximal effective concentration ($EC_{50}$), or a maximum effect ($E_{max}$).

13. The system of claim 9, wherein the prediction system is further configured to predict a set of PK parameters using the PK data density image, and wherein the set of PK parameters comprises at least one of an area under the curve (AUC), a minimum concentration ($C_{min}$), or a maximum concentration ($C_{max}$).

14. The system of claim 9, wherein the deep learning system comprises a neural network system.

15. The system of claim 9, wherein the deep learning system comprises at least one convolutional neural network.

16. The system of claim 9, wherein the prediction system comprises:
   a training module that is configured to train the deep learning system using the simulated PK dataset and the simulated PD dataset.

17. A method for predicting a set of linking parameters that relate pharmacokinetic and pharmacodynamic effects, the method comprising:
   receiving, by one or more processors, a population dataset that comprises a population pharmacokinetic (PK) dataset and a population pharmacodynamic (PD) dataset;
   transforming, by the one or more processors, the population dataset into a plurality of binned intensity images that includes a PK binned intensity image in which each pixel value in at least a portion of the binned intensity image indicates a density of data points corresponding to a selected dose effect and a selected point in time and a PD binned intensity image in which each pixel value in at least a portion of the binned intensity image indicates a density of data points corresponding to selected dose effect and a selected point in time; and
   predicting, by the one or more processors, the set of linking parameters using the plurality of binned intensity images and a deep learning system that comprises at least one neural network, wherein the deep learning system takes the plurality of data density images as input and outputs the predicted set of linking parameters, wherein the deep learning system is trained using a simulated PK dataset and a simulated PD dataset, and wherein the simulated PK dataset is generated based on a simulation of drug concentration with respect to points in time and the simulated PD dataset is generated based on a simulation of drug effect with respect to points in time.

18. The method of claim 17, wherein the set of linking parameters comprises at least one of a slope, a half-maximal effective concentration ($EC_{50}$), or a maximum effect ($E_{max}$).

* * * * *